US007600597B2

(12) United States Patent
Murakami

(10) Patent No.: US 7,600,597 B2
(45) Date of Patent: Oct. 13, 2009

(54) TRAVEL VEHICLE AND TRAVEL CONTROL METHOD FOR THE TRAVEL VEHICLE

(75) Inventor: Takeshi Murakami, Kyoto (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 247 days.

(21) Appl. No.: 11/790,950

(22) Filed: Apr. 30, 2007

(65) Prior Publication Data

US 2007/0253800 A1 Nov. 1, 2007

(30) Foreign Application Priority Data

May 1, 2006 (JP) ............................ 2006-127257

(51) Int. Cl.
*B60K 17/34* (2006.01)

(52) U.S. Cl. ...................................... 180/233; 180/212

(58) Field of Classification Search ................ 180/233, 180/212

See application file for complete search history.

(56) References Cited

U.S. PATENT DOCUMENTS

2004/0061601 A1* 4/2004 Freakes et al. .............. 340/442
2004/0130208 A1* 7/2004 Muller et al. ............... 303/142
2004/0145238 A1* 7/2004 Seto et al. ................... 303/193
2008/0167777 A1* 7/2008 Pothin ......................... 701/41

FOREIGN PATENT DOCUMENTS

JP 2001-105818 4/2001
JP 2001-240213 9/2001
JP 2005-041383 2/2005
JP 2005-41383 A 2/2005
JP 2006-79436 A 3/2006

OTHER PUBLICATIONS

Notification of Reason(s) for Refusal for corresponding Japanese Application No. 2006-127257, with English translation.

* cited by examiner

*Primary Examiner*—Lesley D Morris
*Assistant Examiner*—Tashiana Adams
(74) *Attorney, Agent, or Firm*—Westerman, Hattori, Daniels & Adrian, LLP.

(57) ABSTRACT

The height of the center of gravity of a stacker crane is determined in consideration of a height position of an elevation frame and the inertial force is determined from the travel acceleration and deceleration. Wheel pressures applied to front and rear drive wheels are determined based on the height of the center of gravity, the inertial force, and horizontal distances from the center of gravity to the front and rear drive wheels. Torques are allocated in proportion to the determined wheel pressures.

3 Claims, 4 Drawing Sheets

$$m g = m'(g - a2) + m'' g$$ (m'' is mass of portion other than elevation frame)

$$\therefore \quad m = m'\left(1 - \frac{a2}{g}\right) + m''$$

$$H = \frac{m'\left(1 - \frac{a2}{g}\right) H2 + m'' H3}{m}$$ (H3 is height of center of gravity of portion other than elevation frame)

$$T1 = mg\frac{P2}{P1+P2} + F1$$

$$T2 = mg\frac{P1}{P1+P2} - F2$$

$$maH = F1P1 + F2P2$$

$$F1 = kP1\theta, \quad F2 = kP2\theta$$

$$\therefore maH = k\theta(P1^2 + P2^2)$$

$$\therefore T1 = mg\frac{P2}{P1+P2} + \frac{maP1H}{P1^2+P2^2}$$

$$T2 = mg\frac{P1}{P1+P2} - \frac{maP2H}{P1^2+P2^2}$$

TRAVEL VEHICLE AND TRAVEL CONTROL METHOD FOR THE TRAVEL VEHICLE

TECHNICAL FIELD

The present invention relates to a travel vehicle such as a stacker crane, a rail vehicle, or an automated guided vehicle which travels on the ground without any rails. In particular, the present invention relates to allocation of torques transmitted to a plurality of drive wheels.

BACKGROUND ART

Techniques of changing allocation of torques transmitted to front and rear drive wheels at the time of acceleration and at the time of deceleration are known. For example, in Japanese Laid-Open Patent Publication No. 2005-41383, the proportion of torques transmitted to the rear wheel and the front wheel is switched to 6:4 at the time of acceleration, the proportion of the torques transmitted to the rear wheel and the front wheel is switched to 1:1 at the time of motion at a constant speed, and the proportion of torques transmitted to the rear wheel and the front wheel is switched to 4:6 at the time of acceleration. By changing allocation of the torques transmitted to the rear wheel and the front wheel at the time of acceleration and at the time of deceleration, it is possible to suppress idling or locking of the wheels. The inventor conducted a further study for suitably allocating the torques transmitted to the front drive wheels and the rear drive wheels, and achieved the present invention.

SUMMARY OF THE INVENTION

An object of the present invention is to suitably allocate torques transmitted to front and rear wheels.

Another object of the present invention is to determine wheel pressures based on control data without measuring the wheel pressures using sensors or the like.

Still another object of the present invention is to change torque allocation in correspondence with elevating and lowering of an elevation frame.

According to the present invention, a travel vehicle has a plurality of drive wheels along a travel direction. The travel vehicle comprises wheel pressure detection means for determining a proportion of wheel pressures applied to each of the drive wheels, and torque allocation means for allocating torques required for traveling, to each of the drive wheels in correspondence with the proportion of wheel pressures determined by the wheel pressure detection means.

Preferably, the wheel pressure detection means determines the proportion of the wheel pressures applied to each of the drive wheels based on a height of the center of gravity of the travel vehicle, horizontal distances from the center of gravity to each of the drive wheels, and a travel acceleration and deceleration.

In particular, preferably, the travel vehicle further comprises a mast and an elevation frame which is elevated and lowered along the mast, and the wheel pressure detection means includes means for correcting the height of the center of gravity in correspondence with a height position of the elevation frame.

According to the present invention, a travel control method for a travel vehicle having a plurality of drive wheels along a travel direction comprises the steps of determining a proportion of wheel pressures applied to each of the drive wheels, and allocating torques required for traveling, to each of the drive wheels in correspondence with the determined proportion of the wheel pressures.

ADVANTAGES OF THE INVENTION

In the present invention, the torques are allocated to the drive wheels in correspondence with the proportion of the wheel pressures. Therefore, it is possible to prevent idling, locking, or the like of the wheels due to the excessive or insufficient torque. Further, by allocation without causing any excessive or insufficient torque, it is possible to reduce the amount of dust which would be generated from the drive wheel to which an excessive torque is applied, prevent vibration which would be generated when the drive wheel with the insufficient torque is towed by the drive wheel with the excessive torque, and prevent creaking sounds from being generated from the drive wheel due to locking of the drive wheel. Consequently, the travel vehicle can travel at a greater acceleration and deceleration, and reduction of the travel time is achieved.

By determining the proportion of the wheel pressures applied to the drive wheels based on a height of the center of gravity of the travel vehicle, horizontal distances from the center of gravity to the drive wheels, and a travel acceleration and deceleration, it is not necessary to actually measure the wheel pressures using strain gauges or pressure sensors. Further, feedback of torque allocation after detection of the wheel pressures is not required. Therefore, problems due to the delay in the responsiveness of the sensor or the like do not occur. That is, in correspondence with the travel acceleration and deceleration at each time point, torque allocation can be performed optimally without any delay in the control, or with a slight delay in the control, if any.

In the case of using the travel vehicle having a mast and an elevation frame, the height of the center of gravity significantly changes depending on the height position of the elevation frame. Therefore, by correcting the center of gravity depending on the height position of the elevation frame, the optimum torque allocation can be performed irrespective of the height position of the elevation frame.

DESCRIPTION OF REFERENCE NUMERALS

Figure 1:
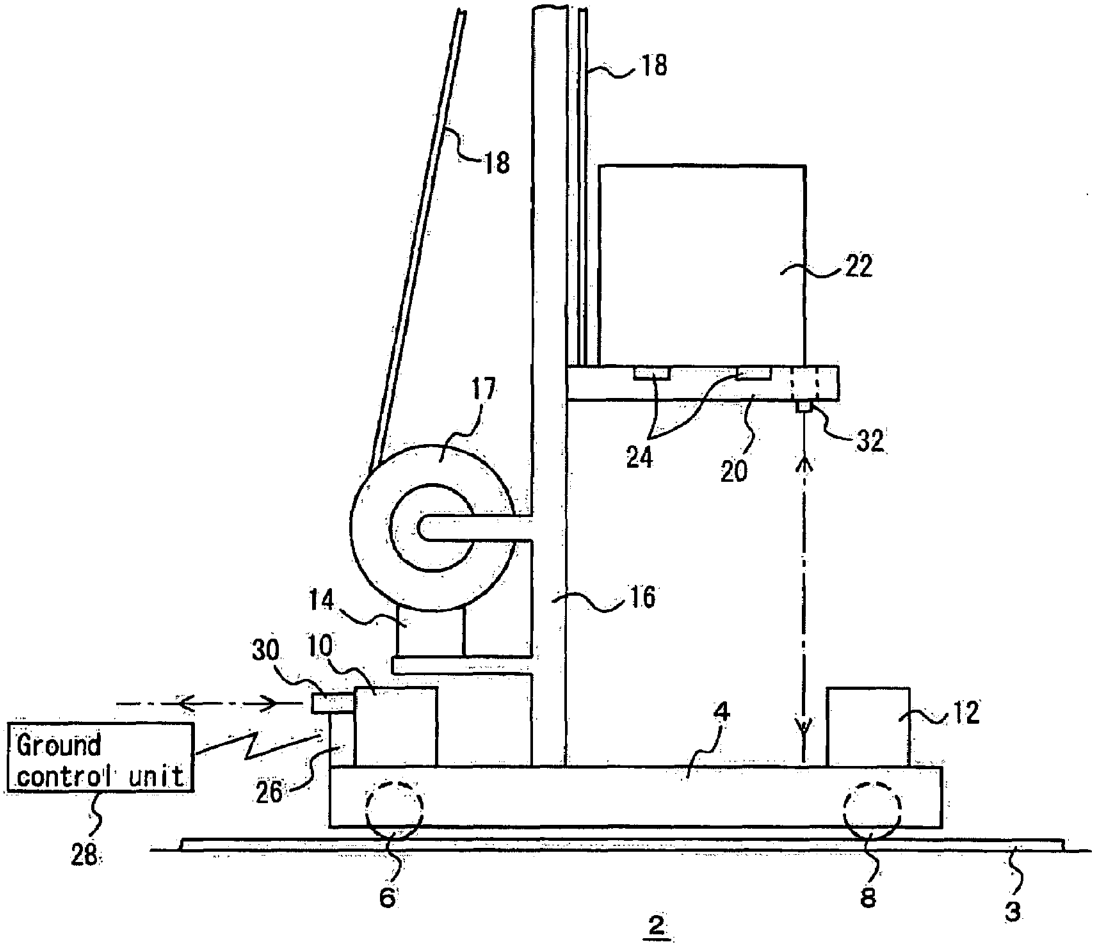
FIG. 1 is a side view showing main components of a stacker crane according to an embodiment.

2 stacker crane
3 travel rail
4 vehicle
6 rear drive wheel
8 front drive wheel
10 rear travel motor
12 front travel motor
14 elevation motor
16 mast
17 drum
18 suspension member

20 elevation frame
22 article
24 slide fork
26 on-machine control unit
28 ground control unit
30, 32 laser distance meter
40 elevating and lowering speed pattern generation unit
41, 51 PID control unit
42, 52 vibration suppression control unit
43 servo mechanism
50 travel speed pattern generation unit
53 torque allocation unit
54, 55 servo mechanism
G center of gravity
g gravity acceleration
a travel acceleration and deceleration
a2 acceleration and deceleration for elevation and descent
m total mass of stacker crane
m' mass of elevation frame
m" mass of portion other than elevation frame
H height of center of gravity of stacker crane
H2 height of center of gravity of elevation frame and article
H3 height of center of gravity of portion other than elevation frame
P1, P2 horizontal distance from center of gravity to drive wheel

Embodiment

FIG. 1 to 4 show a stacker crane 2 according to an embodiment. In the drawings, a reference numeral 4 denotes a vehicle which travels along a travel rail 3. In addition to the vehicle 4, an upper vehicle may be provided. The vehicle 4 has a front drive wheel 6 and a rear drive wheel 8. That is, the vehicle 4 has two front and rear drive wheels in total. Alternatively, the vehicle 4 may have four front and rear wheels in total. A reference numeral 10 denotes a rear travel motor, and a reference numeral 12 denotes a front travel motor. A reference numeral 14 denotes an elevation motor, and a reference numeral 16 denotes a mast. A reference numeral 17 denotes a drum, and a reference numeral 18 denotes a suspension member such as a belt, a wire, or a rope used for elevating and lowering the elevation frame 20 along the mast 16. A reference numeral 22 denotes an article on the elevation frame 20. A reference numeral 24 denotes a slide fork as an example of transfer means. A reference numeral 26 denotes an on-machine control unit. The on-machine control unit 26 controls the motors 10 to 14, the slide fork 24 or the like, receives transportation commands, and reports transportation results. Reference numerals 30, 32 denote laser distance meters. The laser distance meter 30 determines the position in the travel direction, and the laser distance meter 32 determines the height of the elevation frame 20. Instead of using the laser distance meters 30 32, the rotation numbers of the drive wheels 6, 8 and the drum 17 may be measured using encoders (not shown) to determine the position in the travel direction, the travel speed of the stacker crane 2 and the elevating and lowering speed of the elevation frame 20.

Figure 2:
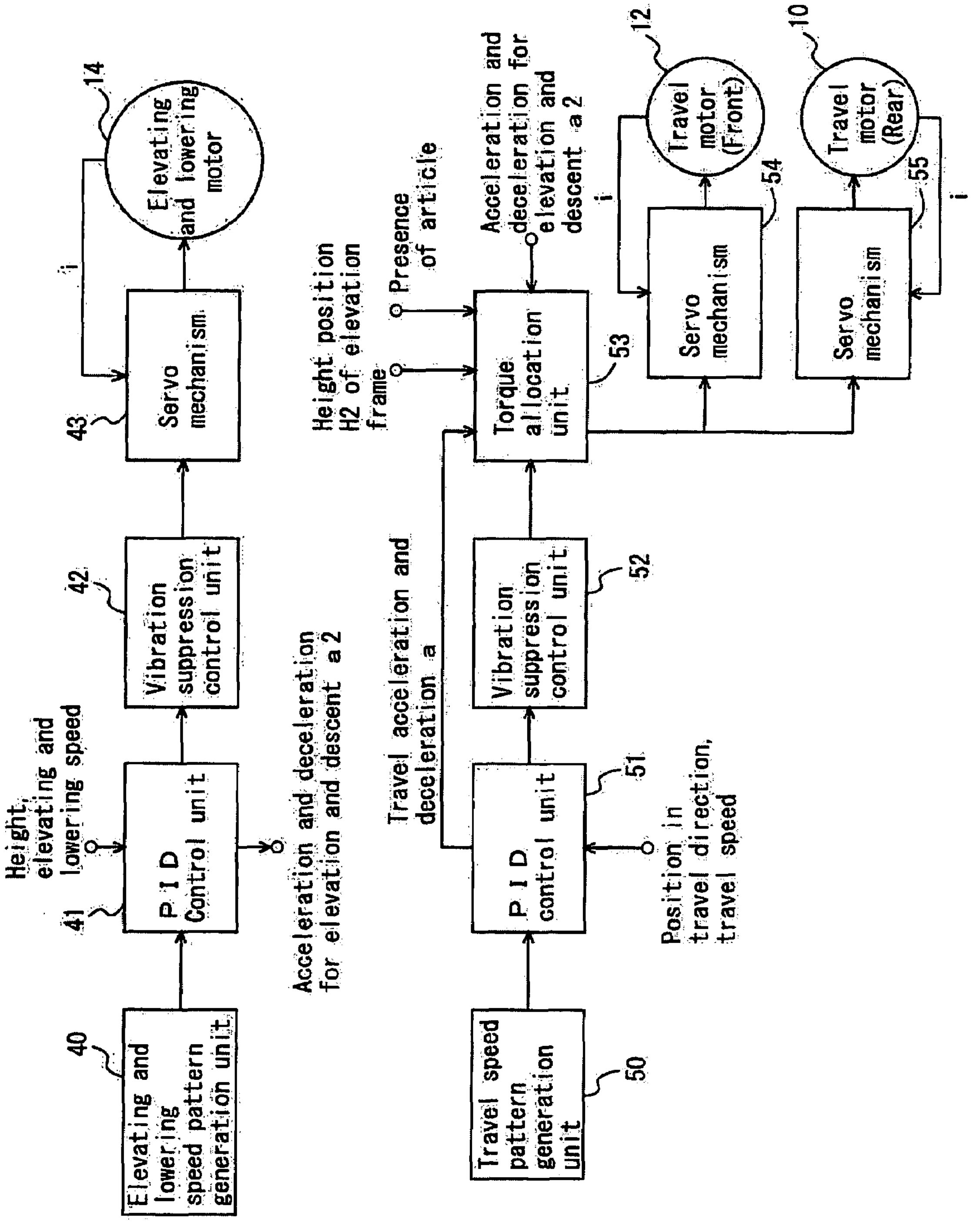
FIG. 2 is a block diagram showing control systems for travel and elevating and lowering of the stacker crane according to the embodiment.

FIG. 2 shows an elevating and lowering control system and a travel control system of the stacker crane. An elevating and lowering speed pattern generation unit 40 generates a speed pattern for elevating and lowering the elevation frame to a target position, and inputs the current height and the elevating and lowering speed of the elevation frame to the PID control unit 41, for generating a control amount. For example, the PID control unit 41 outputs the current target acceleration and deceleration for elevation and descent a2. Alternatively, data of a signal from a height sensor such as the laser distance meter may be subjected to second order differentiation with respect to the time to determine the actual acceleration and deceleration for elevation and descent, and the actual acceleration and deceleration for elevation and descent may be used instead of the target acceleration and deceleration for elevation and descent a2. A vibration suppression unit 42 filters the control amount from the PID control unit 41 such that the control amount in a natural vibration frequency area in the height direction of the elevation frame 20 is eliminated or adds a control amount for generating vibration in opposite phase such that natural vibration of the elevation frame 20 which may be caused at the time of changing the elevating and lowering speed by the PID control unit 41 is offset. The control amount corrected by the vibration suppression control unit 42 is inputted to a servo mechanism 43, and the elevation motor 14 is driven by servo driving. For servo driving, for example, the drive current i of the elevation motor 14 is monitored, and feedback control is implemented.

A travel speed pattern generation unit 50 generates a speed pattern for allowing the vehicle 4 to travel from the current position to the target position, and inputs the position in the travel direction and the travel speed of the vehicle 4 to a PID control unit 51, and a control amount by PID control is generated such that the difference from the travel speed pattern is eliminated. A vibration suppression control unit 52 filters the control amount such that the control amount in a natural vibration frequency area in the travel direction of the stacker crane 2 is eliminated or add a control amount for generating vibration in opposite phase such that natural vibration of the stacker crane 2 which may be caused at the time of acceleration and deceleration in the travel direction is offset. An output of the vibration suppression unit 52 corresponds to the total amount of torques applied to the front and rear travel motors 10, 12. For example, the PID control unit 51 generates a target acceleration and deceleration a at each time point. Alternatively, data of a signal from a position sensor in the travel direction such as the laser distance meter may be subjected to second order differentiation with respect to the time to determine the actual travel acceleration and deceleration, and the actual travel acceleration and deceleration may be used instead of the travel acceleration and deceleration a.

A torque allocation unit 53 allocates the control amount outputted from the vibration suppression unit 52 to the front and rear travel motors. The proportion is a ratio between torques generated by the front and rear travel motors 12, 10. The travel acceleration and deceleration a is inputted to the torque allocation unit 53, e.g., from the PID control unit 51. Alternatively, the travel acceleration and deceleration a may be inputted to the torque allocation unit 53 from the travel speed pattern generation unit 50. Alternatively, the distance determined by the laser distance meter 30 may be subjected to second order differentiation to determine the acceleration and deceleration. Data indicating a height position H2 of the elevation frame and the presence of any article on the elevation frame is inputted to the torque allocation unit 53. Preferably, in addition to these items of data, in order to correct the inertial force applied to the elevation frame, the acceleration and deceleration for elevation and descent a2 is inputted. In the case where the acceleration and deceleration for elevation and descent a2 of the elevation frame is considerably small in comparison with the gravitational acceleration g, e.g., in the case where the acceleration and deceleration for elevation and descent a2 is 1/10 of the gravitational acceleration g or less, the acceleration and deceleration for elevation and descent a2 is negligible. Based on these items of data, wheel pressures applied to the front and rear drive wheels, i.e., reaction forces from the travel surface such as the travel rail 3 are detected. Torques in proportion to the wheel pressures are allocated to front and rear servo mechanisms 54, 55. It is sufficient that the torques are allocated in correspondence with the wheel pressures, and it is not essential that the torques are proportional to the wheel pressures. For example, the torques should be substantially proportional to the wheel pressures. The front and rear servo mechanisms 54, 55 drive the front and rear travel motors 12, 10 by servo driving, respectively, monitor the motor current i of each of the travel motors 12, 10, and implement feedback control. For example, the motor current i is proportional to the output torque in each of the travel motors 12, 10.

Figure 3:
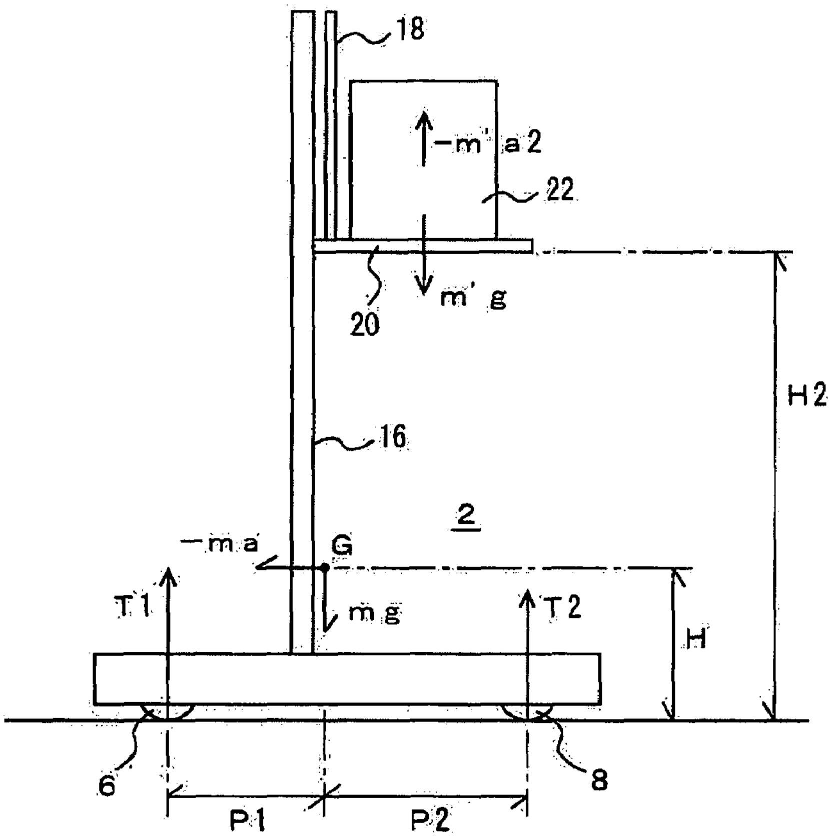
FIG. 3 is a view schematically illustrating balancing of forces applied to the stacker crane.

FIG. 3 shows calculation of the height H of the center of the gravity G of the stacker crane 2. Assuming that the total mass of the elevation frame 20 and the article 22 is m', and the acceleration and deceleration for elevation and descent is a2, the force applied from the elevation frame to the suspension member 18 is expressed by m'(g−a2). Assuming that the mass of portion other than the elevation frame is m", and the apparent mass of the stacker crane 2 is m, the gravity applied to the entire stacker crane 2 is expressed by mg=m'(g−a2)+m"g. Therefore, the apparent mass of the stacker crane 2 is different from the real mass, and expressed by m=m'(1−a2/g)+m". Further, assuming that the height of the center of gravity of the elevation frame and the article is H2, and the height of the center of the gravity of portion other than the elevation frame is H3, from the gravitational formula, the height H of the center of the gravity of the stacker crane is expressed by H=(m'(1−a2/g)H2+m"H3)/m. T1 denotes a wheel pressure applied to the rear drive wheel, T2 denotes a wheel pressure applied to the front drive wheel, and G denotes a position of the center of the gravity. The gravity mg and the inertial force −ma are applied. P1 denotes a horizontal distance from the center of gravity G to the rear drive wheel 6, and P2 denotes a horizontal distance from the center of gravity G to the front drive wheel 8.

Figure 4:
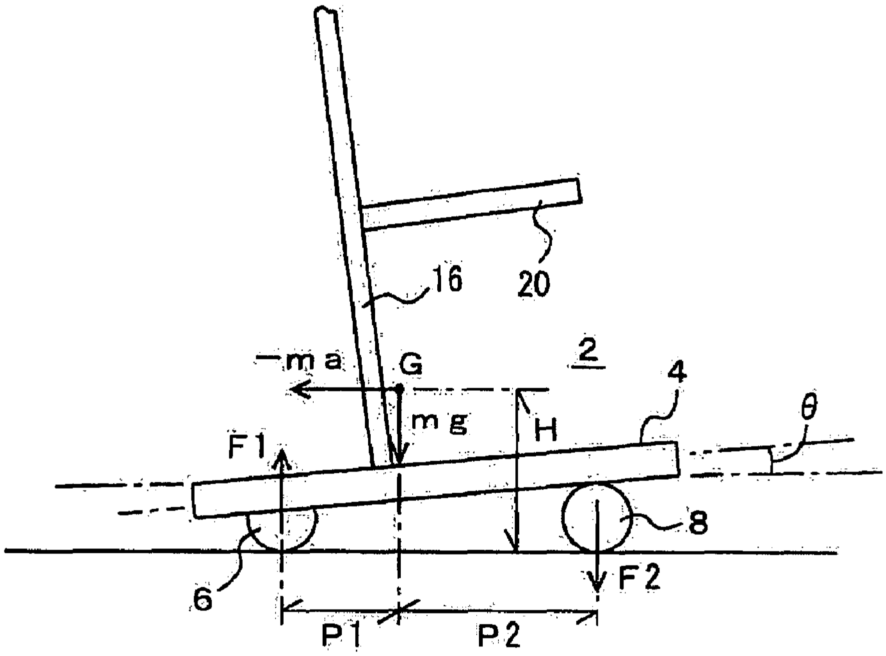
FIG. 4 is a view schematically illustrating wheel pressures T1, T2 of the stacker crane according to the embodiment.

It is assumed that elastic tires are used for the drive wheels 6, 8. FIG. 4 shows calculation of the wheel pressures T1, T2. When the gravity mg applied to the center of gravity G is balanced by the moment, the wheel pressure T1 is mg×P2/(P1+P2). Likewise, the wheel pressure T2 is mg×P1/(P1+P2) for balance with the moment by the gravity mg.

For balance with the moment of the inertial force −ma, the drive wheels 6, 8 are elastically deformed vertically, and the vehicle 4 is slightly inclined by an angle θ from the horizontal direction. Spring forces of the drive wheels 6, 8 generated by the inclination θ are denoted by F1, F2. The wheel pressures T1, T2 shift the spring forces from the above values by the amounts corresponding to F1, F2. Since the moment of the inertial force −ma is balanced by the moment of the spring forces F1, F2, maH=F1P1+F2P2 is obtained. Next, since the spring forces F1, F2 are expressed by F1=kP1θ, F2=kP2θ, respectively, where k is the spring constant, maH=kθ($P1^2$+$P2^2$) is obtained. From the equation, Kθ in the spring force can be calculated. By eliminating the spring forces F1, F2, T1=mg×P2/(P1+P2)+maP1H/($P1^2$+$P2^2$) is obtained, and likewise, T2=mg×P1/(P1+P2)−maP2H/($P1^2$+$P2^2$) is obtained. After the wheel pressures T1, T2 are calculated, in proportion to these values, the torque allocation unit allocates the torques.

In the description, the proportion of the wheel pressures is determined assuming that elastic tires are used for the drive wheels 6, 8. In the case where elasticity of the drive wheels 6, 8 is negligible, for example, the balance between the moment of force by the gravity or the inertial force around the drive wheel 6 and the moment of force of the wheel pressure T2 applied to the drive wheel 8 should be determined. In this manner, the moment of force T2 can be determined. Likewise, from the balance between the moment of force by the gravity or the inertial force around the drive wheel 8 and the moment of force of the wheel pressure applied to the drive wheel 6, the wheel pressure T1 can be determined. Then, the torques may be allocated in proportion to the proportion of the wheel pressures.

By allocating the torques in proportion to the wheel pressures applied to the drive wheels 6, 8, the following advantages can be obtained.

(1) The torques are allocated optimally to the front and rear drive wheels.

(2) Thus, excess or deficiency does not occur in the torques. That is, idling of the drive wheel due to the excessive torque or output of "creaky" locking sounds by locking of the drive wheel due to the insufficient torque does not occur.

(3) Since locking or idling of the wheels does not occur significantly, the stacker crane can travel at a large acceleration and deceleration.

(4) Since the torques are allocated optimally, vibration of stacker crane does not occur significantly.

(5) Since the torques of the front and rear drive wheels are balanced, the amount of dust generated by the contact between the drive wheels and the travel rail is small.

In the embodiment, the stacker crane having one front wheel and one rear wheel is shown as an example. Alternatively, in the case where a stacker crane having four drive wheels including two front wheels and two rear wheels are used, in the same manner as in the case of the embodiment, the torque allocated to the front wheels is determined, and the torque is divided equally for each of the left and right front wheels (½ of the torque is allocated to each of the left and right front wheels). Likewise, the torque allocated to the rear wheels is determined, and the torque is divided equally for each of the left and right rear wheels (½ of the torque is allocated to each of the left and right rear wheels). In the case where an upper vehicle is provided additionally at the upper portion of the stacker crane, the position of the center of gravity of the vehicle by the portion other than the elevation frame should be determined in consideration of the lower vehicle, the upper vehicle, and the mast. Although the embodiment has been described in connection with the case in which the stacker crane is used, the present invention is also applicable to rail vehicles, automated guided vehicles which travel on the ground without using any rails, and in particular, suitably applicable to travel vehicles having a mast and a elevation frame.

The invention claimed is:

1. A travel vehicle having a plurality of drive wheels along a travel direction, the travel vehicle comprising:

wheel pressure detection means for determining a proportion of wheel pressures applied to each of the drive wheels; and torque allocation means for allocating torques required for traveling, to each of the drive wheels in correspondence with the proportion of wheel pressures determined by the wheel pressure detection means, wherein the wheel pressure detection means determines the proportion of the wheel pressures applied to each of the drive wheels based on a height of a center of gravity of the travel vehicle, horizontal distances from the center of gravity to each of the drive wheels, and a travel acceleration and deceleration.

2. The travel vehicle according to claim 1, further comprising a mast and an elevation frame which is elevated and lowered along the mast;

wherein the wheel pressure detection means includes means for correcting the height of the center of gravity in correspondence with a height position of the elevation frame.

3. A travel control method for a travel vehicle having a plurality of drive wheels along a travel direction, the method comprising steps of:

determining a proportion of wheel pressures applied to each of the drive wheels; and allocating torques required for traveling, to each of the drive wheels in correspondence with the determined proportion of the wheel pressures, wherein the proportion of the wheel pressures applied to each of the drive wheels is determined based on a height of a center of gravity of the travel vehicle, horizontal distances from the center of gravity to each of the drive wheels, and a travel acceleration and deceleration.

* * * * *